(12) United States Patent
Nguyen et al.

(10) Patent No.: US 11,286,761 B2
(45) Date of Patent: Mar. 29, 2022

(54) STRENGTHENING PROPPANT ON-THE-FLY DURING HYDRAULIC FRACTURING TREATMENTS

(71) Applicant: Halliburton Energy Services, Inc., Houston, TX (US)

(72) Inventors: Philip D. Nguyen, Houston, TX (US); Tatyana V. Khamatnurova, Houston, TX (US); Loan K. Vo, Houston, TX (US); Walter T. Stephens, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 175 days.

(21) Appl. No.: 16/343,848

(22) PCT Filed: Dec. 27, 2016

(86) PCT No.: PCT/US2016/068743
§ 371 (c)(1),
(2) Date: Apr. 22, 2019

(87) PCT Pub. No.: WO2018/125056
PCT Pub. Date: Jul. 5, 2018

(65) Prior Publication Data
US 2019/0309610 A1 Oct. 10, 2019

(51) Int. Cl.
*E21B 43/267* (2006.01)
*C04B 20/10* (2006.01)
(Continued)

(52) U.S. Cl.
CPC ........ *E21B 43/267* (2013.01); *C04B 20/1081* (2013.01); *C04B 28/006* (2013.01);
(Continued)

(58) Field of Classification Search
CPC .............. E21B 43/267; C04B 20/1081; C04B 28/006; C09K 8/40; C09K 8/68; C09K 8/805; C09K 2208/26
See application file for complete search history.

(56) References Cited

U.S. PATENT DOCUMENTS

| 7,153,575 | B2 | 12/2006 | Anderson et al. |
| 7,350,571 | B2 | 4/2008 | Nguyen et al. |

(Continued)

FOREIGN PATENT DOCUMENTS

| WO | 1992011327 | 7/1992 |
| WO | 2012055028 | 5/2012 |

OTHER PUBLICATIONS

ISRWO International Search Report and Written Opinion for PCT/US2016/068743 dated Sep. 12, 2017.
(Continued)

*Primary Examiner* — Crystal J. Lee
(74) *Attorney, Agent, or Firm* — Thomas Rooney; C. Tumey Law Group PLLC (57) ABSTRACT

A method of treating a subterranean formation comprising: providing a proppant; coating the proppant with a geopolymer composition to create a coated proppant; injecting a fracturing fluid into the subterranean formation, wherein the fracturing fluid comprises a base fluid and the coated proppant; and allowing the geopolymer composition to set in the formation to form a geopolymer on the proppant.

16 Claims, 5 Drawing Sheets (51) Int. Cl.
*C04B 28/00* (2006.01)
*C09K 8/40* (2006.01)
*C09K 8/68* (2006.01)
*C09K 8/80* (2006.01)

(52) U.S. Cl.
CPC .............. *C09K 8/40* (2013.01); *C09K 8/68* (2013.01); *C09K 8/805* (2013.01); *C09K 2208/26* (2013.01)

(56) References Cited

U.S. PATENT DOCUMENTS

| | | | |
|---|---|---|---|
| 9,212,304 | B2 | 12/2015 | McDonald |
| 2006/0100342 | A1 | 5/2006 | Jensen |
| 2008/0028994 | A1* | 2/2008 | Barlet-Gouedard ... C09K 8/467 106/811 |
| 2010/0330380 | A1 | 12/2010 | Colreavy et al. |
| 2011/0073311 | A1* | 3/2011 | Porcherie ............. C04B 28/006 166/305.1 |
| 2013/0233623 | A1 | 9/2013 | Aston et al. |
| 2013/0274153 | A1* | 10/2013 | Urbanek ................ C09K 8/805 507/214 |
| 2014/0076568 | A1* | 3/2014 | McDonald ............. C01B 33/26 166/305.1 |
| 2014/0374093 | A1* | 12/2014 | Nguyen ................ E21B 43/267 166/280.1 |
| 2015/0083414 | A1 | 3/2015 | Monroe et al. |
| 2015/0114640 | A1* | 4/2015 | Bestaoui-Spurr ...... C09K 8/805 166/280.2 |
| 2016/0153274 | A1 | 6/2016 | Hull et al. |
| 2019/0031950 | A1* | 1/2019 | Bestaoui-Spurr ........ C09K 8/62 |

OTHER PUBLICATIONS

Naima Bestaoui-Spurr, SPE168158, Baker Hughes Inc., Materials Science Improves Silica Sand Strength, SPE International Symposium and Exhibition on Formation Damage Control, 2014.

* cited by examiner

STRENGTHENING PROPPANT ON-THE-FLY DURING HYDRAULIC FRACTURING TREATMENTS

BACKGROUND

After a well bore is drilled, it may be necessary to fracture the subterranean formation to enhance hydrocarbon production. This may be of greater importance in shale formations that typically have high-closure stresses. Access to the subterranean formation can be achieved by first creating an access conduit (e.g., perforations) from the well bore to the subterranean formation. Then a fracturing fluid, called a pad, may be introduced at pressures exceeding those required to maintain matrix flow in the subterranean formation to create or enhance at least one fracture that propagates from the well bore. The pad fluid may be followed by a fracturing fluid that includes proppant that are deposited into the fracture or fractures. The proppant may hold the fracture (or fractures) open, thereby maintaining the ability for hydrocarbons to flow through the fracture(s) to ultimately be produced at the surface.

BRIEF DESCRIPTION OF THE DRAWINGS

These drawings illustrate certain aspects of some of the embodiments of the present method, and should not be used to limit or define the method.

DETAILED DESCRIPTION

The systems, methods, and/or compositions disclosed herein may relate to subterranean operations and, in some systems, methods, and compositions, to introduction of a fracturing fluid including a proppant coated with a geopolymer composition into a subterranean formation penetrated by a wellbore. As used herein, the term "coat," "coating," "coated" or the like is not intended to imply in particular degree of coating, but rather means that the geopolymer composition is adhered to at least some portion of the proppant. In contrast to being pre-coated with the geopolymer composition, the geopolymer composition may be mixed with the proppant on the fly before being placed in a wellbore. The fracturing fluid may be used as part of a fracturing operation to enhance the communication between a primary fracture and the remainder of the corresponding complex fracture network. This disclosure also provides methods of applying or coating the geopolymer composition on proppant to create proppant aggregates. The proppant aggregates may have high consolidation strength relative to uncoated proppant.

Oftentimes, it may be advantageous to consolidate proppant once placed in a subterranean formation. Consolidated proppant may be less likely to migrate through the propped fractures and cause production problems. Very fine particles present in the proppant and formation may be especially detrimental to production as they are highly mobile and may cause blockages in the subterranean formation and propped fractures. The blockage may lead to a decreased permeability. The production of solid particles through a wellbore may damage equipment such as pumps, shoes, casings, liners, and other downhole equipment as well as damaging surface equipment such as pumps, tanks, separators, and the like. Therefore, the reduction or elimination of particle migration may prevent a decrease in permeability over time and reduced equipment damage. The reduction of particle migration may result in longer production life for a well and less operational expenditure. Consolidation may involve treatment of the subterranean formation or proppant with a binding agent that will set with time and temperature to form a rigid mass. As will be appreciated by one of ordinary skill in the art, resins such as bisphenol-A resins have been used as consolidating agents with great success.

As disclosed herein, geopolymer compositions may take the place of resins in some applications and may be especially suitable where high consolidation strength and thermal stability is needed. A fracturing fluid may comprise a base fluid, proppant, and a geopolymer composition. The geopolymer composition may be coated on the proppant such that the proppant aggregates comprising the proppant adhered to one another by the geopolymer composition (and ultimately the resultant geopolymer) are formed in the fracture. The proppant coated with the geopolymer composition may have an improved crush strength as compared to uncoated proppant. The geopolymer may be coated on the proppant at any time during the fracturing operation, for example, during proppant transport, during mixing of proppant and base fluid, or after the proppant and base fluid are mixed.

The geopolymer composition may comprise an aluminosilicate source, a metal silicate source, and an activator. The geopolymer composition may react to form a geopolymer. A geopolymer is an inorganic polymer that forms long-range, covalently bonded, non-crystalline networks. The production of a geopolymer is known as geosynthesis, a reaction process that may involve naturally occurring aluminosilicates. Geopolymers may be formed by chemical dissolution and subsequent re-condensation of various aluminosilicates and silicates to form a 3D-network or three-dimensional mineral polymer. Geopolymers based on aluminosilicates may be designed as poly(silate), which is a shorter version of poly(silicon-oxo-aluminate). The silate network may comprise silicate and aluminate tetrahedrals linked alternately by sharing all oxygens, with $Al^{3+}$ and $Si^{4+}$ in IV-fold coordination with oxygen. A general geosynthesis reaction, which may not be representative of all geosynthesis reactions, is presented below in Equation 1. In Equation 1, aluminate, silicate, and metal hydroxide react to form the geopolymer.

(1)

(2)

In Equation 1, the metal hydroxide, MOH, may comprise group 1 and 2 hydroxides. Some suitable hydroxides may include, but are not limited to, potassium hydroxide, sodium hydroxide, and calcium hydroxide. The degree of polymerization is denoted by n and the atomic ratio of Si to Al is denoted by z. The metal hydroxide may act as an activator for the geosynthesis reaction and as a stabilizing agent to the final polymer matrix. Equation 2 illustrates how the metal ion may act as a counter ion to counterbalance the negative charge of the aluminum metal. The geosynthesis reaction may be kinetically favored due to the presence of the counter anion. Other compounds may act as activators and may include, but are not limited to, chloride salts such as KCl, $CaCl_2$, NaCl, carbonates such as $Na_2CO_3$, silicates such as sodium silicate, aluminates such as sodium aluminate, and ammonium hydroxide. In general, the activators that do not comprise metal hydroxides may require an addition of hydroxide from another source to increase the rate of the reaction. In each case, the cation in the compound may also act as a counter anion. In some examples, a metal hydroxide and salt may be used together. In other examples, combinations of any salts, silicates, carbonates, aluminates, metal hydroxides, and ammonium hydroxide may be used. The activator may be dry mixed with the other geopolymer components to make the geopolymer composition. In other examples, the activator may be in an aqueous solution. The activator may be included in an amount in the range of from about 1% to about 20% by weight of the geopolymer composition. Some geopolymer compositions may have an activator included in amounts of about 1% to about 5%, about 5% to about 10%, about 10% to about 15%, about 15% to about 20%, or about 10% to about 20% by weight of the geopolymer composition. With the benefit of this disclosure, one of ordinary skill in the art should be able to select an appropriate activator for any particular application.

The aluminosilicate source may comprise any suitable aluminosilicate. Aluminosilicate is a mineral comprising aluminum, silicon, and oxygen, plus counter-cations. There are potentially hundreds of suitable minerals that may be an aluminosilicate source in that they may comprise aluminosilicate minerals. Each aluminosilicate source may potentially be used in a particular case if the specific properties, such as composition, may be known. Some minerals such as andalusite, kyanite, and sillimanite are naturally occurring aluminosilicate sources that have the same composition, $Al_2SiO_5$, but differ in crystal structure. Each mineral andalusite, kyanite, or sillimanite may react more or less quickly and to different extents at the same temperature and pressure due to the differing crystal structures. The final geopolymer created from any one aluminosilicate may have both microscopic and macroscopic differences such as mechanical strength and thermal resistivity owing to the different aluminosilicate sources. Aluminosilicate may be a major component of kaolin and other clay minerals. Partially calcined clays such as kaolin may be an especially cost-effective and readily available aluminosilicate source. Other suitable aluminosilicate sources may include, but are not limited to, calcined clays, partially calcined clays, kaolinite clays, lateritic clays, illite clays, volcanic rocks, mine tailings, blast furnace slag, and coal fly ash. The aluminosilicate source may be present in an amount in the range of from about 1% to about 80% by weight of the geopolymer composition. Some geopolymer compositions may have the aluminosilicate source present in about 1% to about 10%, about 10% to about 20%, about 20% to about 30%, about 30%, to about 40%, about 40% to about 50%, about 50% to about 60%, about 60% to about 70%, about 70% to about 80%, or about 40% to about 80% by weight of the geopolymer composition. For each geopolymer application the individual components must be evaluated. One of ordinary skill in the art with the benefit of this disclosure should be able to select an aluminosilicate source and concentration that is appropriate for a particular application.

The metal silicate source may comprise any suitable metal silicate. A silicate is a compound containing an anionic silicon compound. Some examples of a silicate include the orthosilicate anion also known as silicon tetroxide anion, $SiO_4^{4-}$ as well as hexafluorosilicate $[SiF_6]^{2-}$. Other common silicates include cyclic and single chain silicates which may have the general formula $[SiO_{2+n}]^{2n-}$ and sheet-forming silicates $([SiO_{2.5}]^-)_n$. Each silicate example may have one or more metal cations associated with each silicate molecule. Some suitable metal silicate sources and may include, without limitation, sodium silicate, magnesium silicate, and potassium silicate. The metal silicate source may be present in an amount in the range of from about 1% to about 80% by weight of the geopolymer cement composition. Some geopolymer compositions may have the metal silicate source present in about 1% to about 10%, about 10% to about 20%, about 20% to about 30%, about 30%, to about 40%, about 40% to about 50%, about 50% to about 60%, about 60% to about 70%, about 70% to about 80%, or about 40% to about 80% by weight of the geopolymer composition. For each geopolymer application the individual components must be evaluated. One of ordinary skill in the art with the benefit of this disclosure should be able to select a metal silicate containing source and concentration that is appropriate for a particular application.

The geopolymer composition may be present in the fracturing fluid in any suitable concentration or loading. Without limitation, the geopolymer may be present in an amount of about 1 pound per gallon ("lb/gal") to about 20 lb/gal (0.1198 kg/L to 2.397 kg/L), about 1 lb/gal (0.1198 kg/L) to about 5 lb/gal (0.5991 kg/L), about 5 lb/gal (0.5991 kg/L) to about 10 lb/gal (1.198 kg/L), about 10 lb/gal (1.198 kg/L) to about 15 lb/gal (1.797 kg/L), about 15 lb/gal (1.197 kg/L) to about 20 lb/gal (2.397 kg/L), about 1 lb/gal (0.1198 kg/L) to about 10 lb/gal (1.198 kg/L), or about 10 lb/gal (1.198 kg/L) to about 20 lb/gal (2.397 kg/L). With the benefit of this disclosure, one of ordinary skill in the an should be able to select an appropriate loading.

The components of the geopolymer compositions may be combined in any order desired to form a geopolymer composition that may be placed into a subterranean formation or used as a component of a fracturing fluid. As previously mentioned, the geopolymer components may be in a solid or liquid form depending on the source and desired application. The present disclosure may generally be directed to mixing the geopolymer composition with the proppant on the fly before being placed in a wellbore.

The geopolymer composition may be dry blended with the proppant during proppant transport. Dry blending may comprise blending at any time before the geopolymer composition and proppant are in contact with water. Proppant transport may be any time the proppant is moved or stored. Typically, the proppant is stored in containers at a fracturing site with a delivery system such a moving belt to transport proppant to blending, mixing, or pumping equipment. Although a moving belt may be a typical mode of proppant transport, one of ordinary skill would understand that other systems such as, negative pressure pneumatic conveying systems, positive pressure conveying pneumatic systems, combination pressure pneumatic conveying systems, gravity operated systems, screw-type conveying systems, tubular drag conveyors, aero-mechanical conveyors, and any other conveyance means known in the art may also be used. Dry blending may occur in storage containers, during transport to equipment, or during delivery into blending, mixing, and pumping equipment. Dry blending may comprise blending all components of the geopolymer composition or only selected components with the proppant. In some examples, such as when the activator is a solid, the activator may be dry blended with the other geopolymer components and proppant.

The geopolymer composition may also be wet blended with the proppant. Proppant may be delivered to a mixing tub or other vessel where the geopolymer composition may be mixed with the proppant. In some examples, a mixing tub may comprise a fracturing fluid blending unit. Proppant and geopolymer components may be blended with water and other fracturing fluid components such as gelling agents and friction reducers, among others, to produce a fracturing fluid. In another example, the proppant may be dry coated with all the dry components of the geopolymer composition and then a liquid activator such as a sodium hydroxide solution may be added in a fracturing tub with the fracturing fluid components and coated proppant.

The components of the geopolymer compositions may be combined using any mixing device compatible with the composition, including a bulk mixer, for example. In some examples, a geopolymer composition may be formed by dry blending dry components comprising the aluminosilicate source, the metal silicate source, and an activator. The dry blend of the geopolymer composition may then be combined with water (e.g., tap water, seawater, saltwater, etc.) to form a geopolymer slurry which may be included in a fracturing fluid. In another example, a dry blend of the geopolymer composition may be combined with other components of a fracturing fluid such as proppant and water to form a fracturing fluid. Those of ordinary skill in the art will appreciate that examples of the geopolymer slurries generally should have a density suitable for a particular application. By way of example, geopolymer slurries may have a density of about 9 lb/gal (1.078 kg/L) to about 20 lb/gal (2.397 kg/L). The thickening and setting time for a particular geopolymer slurry may be controlled by modifying the slurry density. In general, a relatively thinner composition will take relatively more time to set than a relatively thicker composition. In certain examples, the geopolymer cement slurries may have a density of about 14 lb/gal (1.678 kg/L) to about 17 lb/gal (2.037 kg/L). Additionally, a fracturing fluid comprising a geopolymer slurry should have a density appropriate for a particular application. By way of example, fracturing fluids may have a density of about 9 lb/gal (1.078 kg/L) to about 20 lb/gal (2.397 kg/L). Fracturing fluid densities may be adjusted based on the amount of proppant loading for example. Those of ordinary skill in the art, with the benefit of this disclosure, will recognize the appropriate density for a particular application.

In some embodiments, a geopolymer may have a thickening time of greater than about 1 hour, alternatively, greater than about 2 hours, alternatively greater than about 5 hours at 3,000 psi (20684.27 kPa) and temperatures in a range of from about 50° F. (10° C.) to about 400° F. (204.444° C.), alternatively, in a range of from about 80° F. (26.66° C.) to about 250° F. (482° C.), and alternatively at a temperature of about 140° F. (60° C.). As used herein, the term "thickening time" refers to the time required for a geopolymer composition to reach 70 Bearden units of Consistency ("Bc") as measured on a high-temperature high-pressure consistometer in accordance with the procedure for determining cement thickening times set forth in API Recommended Practice 10B-2 (July 2005.)

In some examples, the fracturing fluid comprising a geopolymer may be essentially free of any additional cementitious materials, such as hydraulic cements, including, but not limited to, those comprising calcium, aluminum, silicon, oxygen, iron, and/or sulfur, which set and harden by reaction with water. Specific examples of hydraulic cements include, but are not limited to, Portland cements, pozzolana cements, gypsum cements, high alumina content cements, silica cements, slag cements, and any combination thereof. Furthermore, the geopolymer compositions may be essentially free of cement kiln dust (CKD).

As previously mentioned, a fracturing fluid may comprise a geopolymer composition, a proppant, and a base fluid. Examples of fracturing fluids may include, without limitation, aqueous-based fluids, non-aqueous-based fluids, slickwater fluids, aqueous gels, viscoelastic surfactant gels, foamed gels, and emulsions, for example. Examples of suitable aqueous-based fluids may include fresh water, saltwater, brine, seawater, and/or any other aqueous fluid that may not undesirably interact with the other components used in accordance with the present disclosure or with the subterranean formation. Examples of suitable non-aqueous-based fluids may include organic liquids, such as hydrocarbons (e.g., kerosene, xylene, toluene, or diesel), oils (e.g., mineral oils or synthetic oils), esters, and any combination thereof. Suitable slickwater fluids may generally be prepared by addition of small concentrations of polymers, such as friction reducers, to water to produce what is known in the art as "slickwater." Suitable aqueous gels may generally comprise an aqueous fluid and one or more viscosifying agent or gelling agents such as, but not limited to, guar gum, hydroxyl propyl guar, carboxymethyl hydroxypropyl guar, hydroxyethyl cellulose, and combinations thereof. Suitable emulsions may be comprised of two immiscible liquids such as an aqueous fluid or gelled fluid and a hydrocarbon. Foams may be created by the addition of a gas, such as carbon dioxide or nitrogen. Additionally, the fracturing fluid may be an aqueous gel comprised of an aqueous fluid, a gelling agent for gelling the aqueous fluid and increasing its viscosity, and, optionally, a crosslinking agent for crosslinking the gel and further increasing the viscosity of the fracturing fluid. The viscosity of a fluid may be any viscosity suitable for a particular application. In some examples the viscosity may be from about 4 cP (centipoise) to about 50 cP. The increased viscosity of the gelled, or gelled and crosslinked, fracturing fluid, inter alia, may reduce fluid loss and may allow the fracturing fluid to transport significant quantities of suspended particulates. The density of the fracturing fluid may be increased to provide additional particle transport and suspension in some applications. The fracturing fluid may further comprise crosslinking agents, gel breaking agents, and any combinations thereof.

In certain systems, methods, and/or compositions of the present disclosure, a friction reducing polymer may be used. The friction reducing polymer may be included in the fracturing fluid to form a slickwater fluid, for example. The friction reducing polymer may be a synthetic polymer. Additionally, for example, the friction reducing polymer may be an anionic polymer or a cationic polymer. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. Suitable friction reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the fracturing fluid. The term "polymer" in the context of a friction reducing polymer, may be intended to refer to the acid form of the friction reducing polymer, as well as its various salts.

The friction reducing polymer may be included in the fracturing fluid, for example, in an amount of about 0.5 GPT (0.5 L/1000 L) to about 10 GPT (10 L/1000 L), about 0.5 GPT (0.5 L/1000 L) to about 5 GPT (5 L/1000 L), or about 5 GPT (5 L/1000 L) to about 10 GPT (10 L/1000 L). GPT refers to gallons of additive per thousand gallons of fluid the additive is placed in. The friction reducing polymers may be included in the fracturing fluid in an amount sufficient to reduce friction without gel formation upon mixing. By way of example, the fracturing fluid comprising the friction reducing polymer may not exhibit an apparent yield point. While the addition of a friction reducing polymer may minimally increase the viscosity of the carrier fluid, the friction reducing polymers may generally not be included in the example fracturing fluid in an amount sufficient to substantially increase the viscosity. For example, when proppant are included in the fracturing fluid, velocity rather than fluid viscosity generally may be relied on for proppant transport. Additionally, the friction reducing polymer may be present in an amount in the range from about 0.01% to about 0.15% by weight of the fracturing fluid. Alternatively, the friction reducing polymer may be present in an amount in the range from about 0.025% to about 0.1% by weight of the fracturing fluid. One of ordinary skill in the art with the benefit of this disclosure should be able to select an appropriate carrier fluid for a particular application.

Where foamed, examples of the fracturing fluids may comprise a foaming agent for providing a suitable foam. As used herein, the term "foaming agent" refers to a material or combination of materials that facilitate the formation of a foam in a liquid. Any suitable foaming agent for forming a foam in an aqueous liquid may be used in examples of the treatment fluids. Examples of suitable foaming agents may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; amine oxides, alpha olefin sulfonate, alkylaryl sulfonates, and combinations thereof. An example of a suitable foaming agent is FOAMER™ 760 foamer/stabilizer, HC-2™ agent, and Pen-5M™ foaming agent, all available from Halliburton Energy Services, Inc. Generally, the foaming agent may be present in examples of the foamed treatment fluids in an amount sufficient to provide a suitable foam. In some examples, the foaming agent may be present in an amount in the range of from about 0.8% to about 5% by volume of the treatment fluid.

Proppant may comprise any suitable material. In general, proppant could have a crush strength higher than the fracture gradient of the formation so as to avoid crushing the proppant or proppant may have a crush strength lower than the fracture gradient of the formation, for example, to enhance other properties. In addition, use of the geopolymer as described herein may allow use of proppant with lower crush strength as desired for a particular application. Proppant should also be resistant to chemical attack from chemicals present in the subterranean formation and from chemicals added to the fracturing fluid. Some suitable proppant without limitation may include silica sand, desert sand, beach sand, brown sand, white sand, ceramic beads, glass beads, bauxite grains, sized calcium carbonate, walnut shell fragments, aluminum pellets, nylon pellets, nut shells, gravel, resinous particles, alumina, minerals, carbon fibers, fiberglass, polymeric particles, volcanic aggregates, expanded perlite pumice, nanoclays, calcium carbonate sand, resin coated sand, ceramic proppants, fly ash, sintered bauxite, and combinations thereof. The proppant may comprise any density. In some examples, proppant may be classified as lightweight or low density and may have a density of about 1.25 $g/cm^3$ to about 2.2 $g/cm^3$. Using low density proppant may have several advantages including but not limited to increased conductivity, easier placing with low viscosity fluids, and more uniform distribution within a fracture. Proppant may comprise any shape, including but not limited, to spherical, toroidal, amorphous, planar, cubic, or cylindrical. Proppant may further comprise any roundness and sphericity. Without limitation, the proppant may have a particle size in a range from about 2 mesh to about 400 mesh, U.S. Sieve Series. By way of example, the proppant may have a particle size of about 10 mesh to about 70 mesh with distribution ranges of 10-20 mesh, 20-40 mesh, 40-60 mesh, or 50-70 mesh, depending, for example, on the particle sizes of the formation particulates to be screen out.

Proppant may be present in the fracturing fluid in any concentration or loading. Without limitation, the proppant may be present in an amount of about 1 pound per gallon ("lb/") to about 20 lb/gal (0.1198 kg/L to 2.397 kg/L), about 1 lb/gal (0.1198 kg/L) to about 5 lb/gal (0.5991 kg/L), about 5 lb/gal (0.5991 kg/L) to about 10 lb/gal (1.198 kg/L), about 10 lb/gal (1.198 kg/L) to about 15 lb/gal (1.797 kg/L), about 15 lb/gal (1.197 kg/L) to about 20 lb/gal (2.397 kg/L), about 1 lb/gal (0.1198 kg/L) to about 10 lb/gal (1.198 kg/L), or about 10 lb/gal (1.198 kg/L) to about 20 lb/gal (2.397 kg/L). With the benefit of this disclosure, one of ordinary skill in the art should be able to select an appropriate proppant particle and loading.

The fracturing fluid and/or the geopolymer composition may comprise nanoparticles and/or micro particles. Suitable examples may include oxides, carbides, borides, and nitrides of metals or of semimetals. Specific examples may include alumina, boron carbide, boron nitride, silicates, fly ash, glass microspheres, silicon carbide, silica, quartz, copper oxide, micro and nanofibers, core-shell particles, n-$Na_2SiO_3$ or nanoparticle graphene or a combination thereof functionalized with oxides, carbide, borides, and nitrides.

The fracturing fluid may comprise a dispersing agent. Some examples of dispersants may include, but are not limited to, aminosilanes, acacia gum, acrylamide copolymer, acrylate copolymers and their ammonium salts, acrylic acid homopolymer, 2-acrylamido-2-methylpropane sulfonic acid copolymer, carboxylate and sulfonate copolymer, coglycerides, dicaprylyl carbonate, maleic anhydride, phosphinocarboxylic acid, polyacrylic acid, propylheptyl caprylate, sodium acrylate homopolymer, and sodium nitrite. Additional additives may include, but are not limited to, surfactants, friction reducers, lubricants, and consolidating agents. The additives may be present in any concentration. Without limitation, the additives, including the dispersing agents, may be present in an amount of about 1 GPT (1 L/1000 L)

to about 50 GPT (50 L/1000 L), about 1 GPT (1 L/1000 L) to about 10 GPT (10 L/1000 L), about 10 GPT (10 L/1000 L) to about 20 GPT (20 L/1000 L), about 20 GPT (20 L/1000 L) to about 30 GPT (30 L/1000 L), about 30 GPT (30 L/1000 L) to about 40 GPT (40 L/1000 L), about 40 GPT (40 L/1000 L) to about 50 GPT (50 L/1000 L), about 1 GPT (1 L/1000 L) to about 25 GPT (25 L/1000 L), or about 25 GPT (25 L/1000 L) to about 50 GPT (50 L/1000 L). GPT refers to gallons of additive per thousand gallons of fluid the additive is placed in. One of ordinary skill in the art, with the benefit of this disclosure, should be able to select appropriate additives and concentrations for a particular application.

According to some examples of the present invention, a fracture may be created and/or extended by any suitable means. Such means are well-known to those skilled in the relevant art. For example, a fracturing fluid, commonly referred to as a pre-pad or pad fluid, may be injected to initiate the fracturing of a subterranean formation prior to the injection of a proppant. In such examples, the pre-pad or pad fluid may be proppant-free or substantially proppant-free. Substantially proppant free refers to the presence of proppant anywhere in the range of about 0.05 lb/gal (0.00599 kg/L) to 0.5 lb/gal (0.0599 kg/L) (or less). One of ordinary skill in that art would understand that due to physical limitations within mixing, pumping, conduits, and other equipment, a small amount of proppant may be present in a pre-pad or pad fluid. Substantially proppant free also includes examples where no proppant is present. In other examples, the proppant may be suspended in a slurry which may be injected into the subterranean formation to create and/or extend at least one fracture. In order to create and/or extend a fracture, a fracturing fluid is typically injected into the subterranean formation at a rate sufficient to generate a pressure above the fracture gradient. In some examples, the pad may comprise a geopolymer composition. The geopolymer composition may enter the formation after at least one fracture has been created and at least partially coat the fracture. The geopolymer composition placed in a fracture before the introduction of geopolymer coated proppant may better allow the coated proppant to adhere to the faces of a fracture.

Traditional fracturing operations may involve packing relatively high volumes of proppant within a fracture. In such operations, a single homogeneous proppant pack is typically formed, which may be used to abut the fracture so that production fluids can be recovered through to the relatively small interstitial spaces between the tightly packed proppant. In some examples of the present application, a fracturing fluid may be introduced into a subterranean formation after the pre-pad or pad fluid. The fracturing fluid may comprise the geopolymer composition and the proppant, wherein the geopolymer composition may be coated on the proppant. The fracturing fluid may be injected in small volumes and alternated between proppant-free and proppant-laden fluid. The proppant-free fluid intermittently injected into the fracture with the fracturing fluid that is proppant laden will be referred to herein as a "spacer fluid." This spacer fluid may be an aqueous gel, for example, comprising an aqueous base fluid, a gelling agent, and an optional crosslinking agent. The spacer fluid may be the same fluid as the fracturing fluid comprising the proppant. The alternating of proppant-free and proppant-laden fluid may form a plurality of proppant aggregates surrounded by spacer fluid. In some examples, the spacer fluid may be a cross-linked gel. The proppant aggregates may be allowed to set in the formation, effectively consolidating the aggregates. If the spacer fluid is cross linked, a breaker (e.g., oxidizers) may break the spacer fluid and decrease the viscosity. The well may be back flowed to allow the broken spacer fluid to exit the formation thereby forming proppant free channels surrounding the consolidated proppant aggregates and connecting the high conductive propped fracture with the wellbore. A mixture of the proppant aggregates and proppant free channels may exhibit a conductivity as measured by API 19D test method. The conductivity of proppant aggregates and proppant free channels may be about 50 mD-ft or greater, about 100 mD-ft or greater, about 200 mD-ft or greater, about 500 mD-ft or greater, about 1000 mD-ft or greater, about 2000 mD-ft or greater, about 5000 mD-ft or greater, about 10,000 mD-ft or greater, or about 20,0000 mD-ft or greater. In addition, the proppant aggregates, after consolidation can be permeable and exhibit a conductivity as measured by API 19D test method. The conductivity of the proppant aggregates can be about 50 mD-ft or greater, 100 mD-ft or greater, about 200 mD-ft or greater, about 500 mD-ft or greater, about 1000 mD-ft or greater, about 2000 mD-ft or greater, or 5000 mD-ft or greater.

A method of treating a subterranean formation may comprise creating at least one fracture in the subterranean formation, providing a fracturing fluid comprising proppant and a geopolymer composition coated on the proppant, wherein the geopolymer composition comprises an aluminosilicate source, a metal silicate source, and an activator, alternately injecting a spacer fluid and the fracturing fluid into the fracture such that a plurality of proppant aggregates are disposed in the fracture surrounded by the spacer fluid, wherein the proppant aggregates each comprise a portion of the proppant coated with a volume of the geopolymer composition; and allowing the geopolymer composition to set in the formation such that the proppant aggregates gain consolidation strength. Creating the fracture may comprise injecting a fracturing fluid (e.g., a pad or pre-pad fluid) that is proppant-free into the subterranean formation at a pressure that is above a fracture gradient. The step of providing a fracturing fluid comprising proppant and a geopolymer composition may comprise coating the geopolymer composition on the proppant while blending the proppant with a base fluid to form the fracturing fluid as previously discussed. A dry blend of the geopolymer composition may be combined with the base fluid. The spacer fluid may comprise water, a gelling agent, a crosslinking agent, and a breaker. The method may further comprise allowing the spacer fluid to break after the step of allowing the geopolymer composition to set in the formation. The method may further comprise flowing back the spacer fluid from the fracture, after the step of allowing the spacer fluid to break, to remove at least a portion of the spacer fluid from the fracture such that proppant-free channels are formed surrounding the proppant aggregates. The fracturing fluid may be transported into the subterranean formation through a tubular and the spacer fluid may be transported into the subterranean formation through an annulus between the tubular and the subterranean formation. Allowing the geopolymer composition to set may comprise a reaction that comprises aluminosilicates to form a geopolymer.

Consolidation strength of the proppant aggregates may be measured using an unconfined compressive strength tests wherein the proppant aggregates are crushed without being confined. The consolidation strength, as measured using the unconfined compressive strength tests, refers to the stress required to cause breakage of a proppant aggregate with a diameter to height ratio of 1:2 to 1:1.5. The consolidation strength of a proppant aggregate, as measured using the unconfined compressive strength tests, may be greater than about 50 psi (344.738 kPa) or greater, about 100 psi (689.476 kPa) or greater, about 200 psi (1378.95 kPa) or greater, about 500 psi (3447.38 kPa) or greater, about 1000 psi (6894.76 kPa) or greater, about 2000 psi (13789.51 kPa) or greater, or about 5000 psi (34473.79 kPa) or greater.

Figure 1:
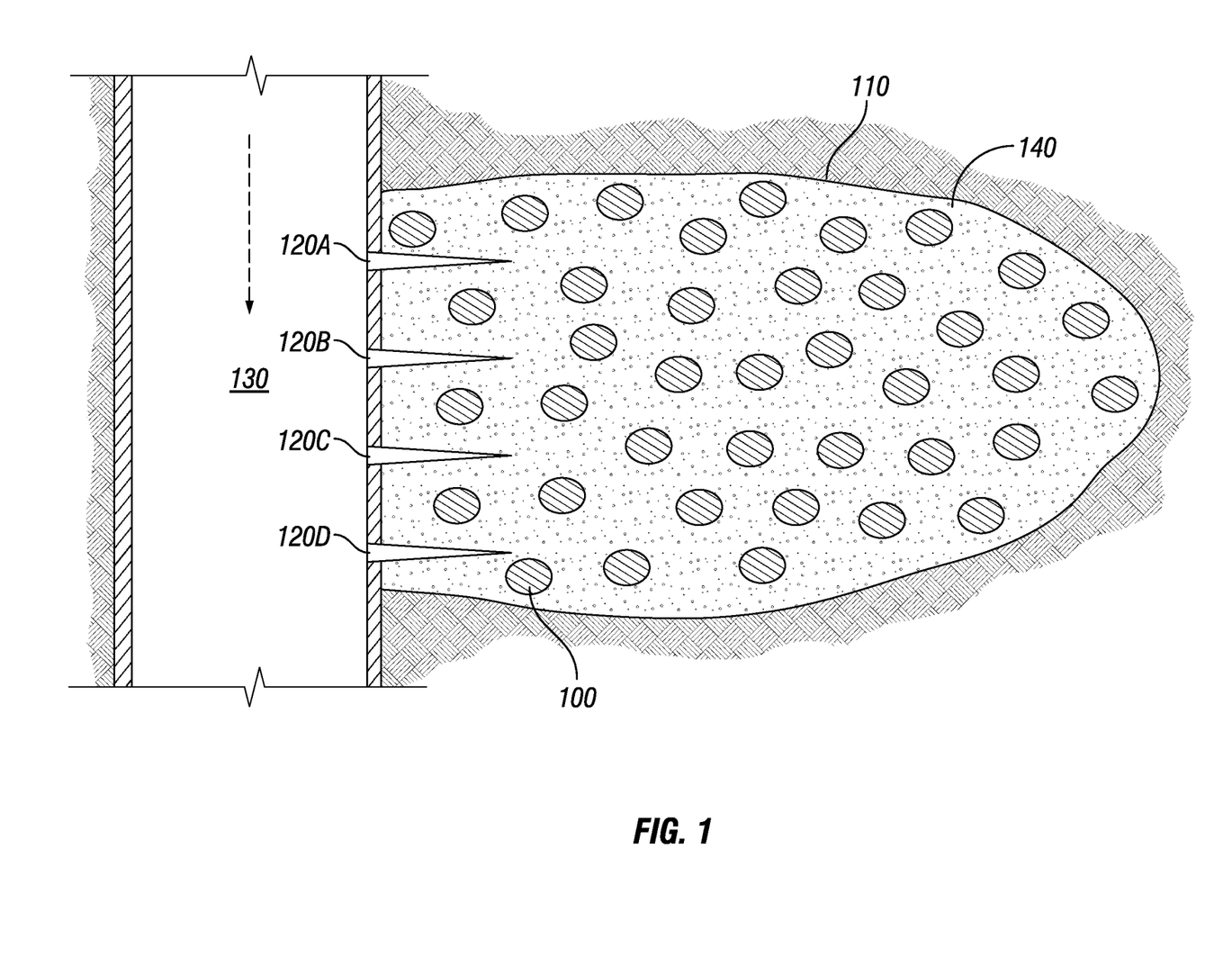
FIG. 1 is a schematic illustration of example proppant aggregates disposed in a fracture.

Referring to FIG. 1, proppant aggregates 100 are shown disposed in fracture 110. Proppant aggregates 100 may suspended in fracturing fluid 140 and have been transported into fracture 110 through perforations 120a-d on a casing or liner 130 that spans the wellbore, including zones containing the fracture 110. As previously described, the proppant aggregates 100 may comprise proppant coated with a geopolymer composition. The geopolymer composition may adhere the proppant to one another. Perforations 120a-d can be formed by any suitable means including, but not limited to, jet perforating guns equipped with shaped explosive charges, abrasive jetting, and high-pressure fluid jetting.

Figure 2:
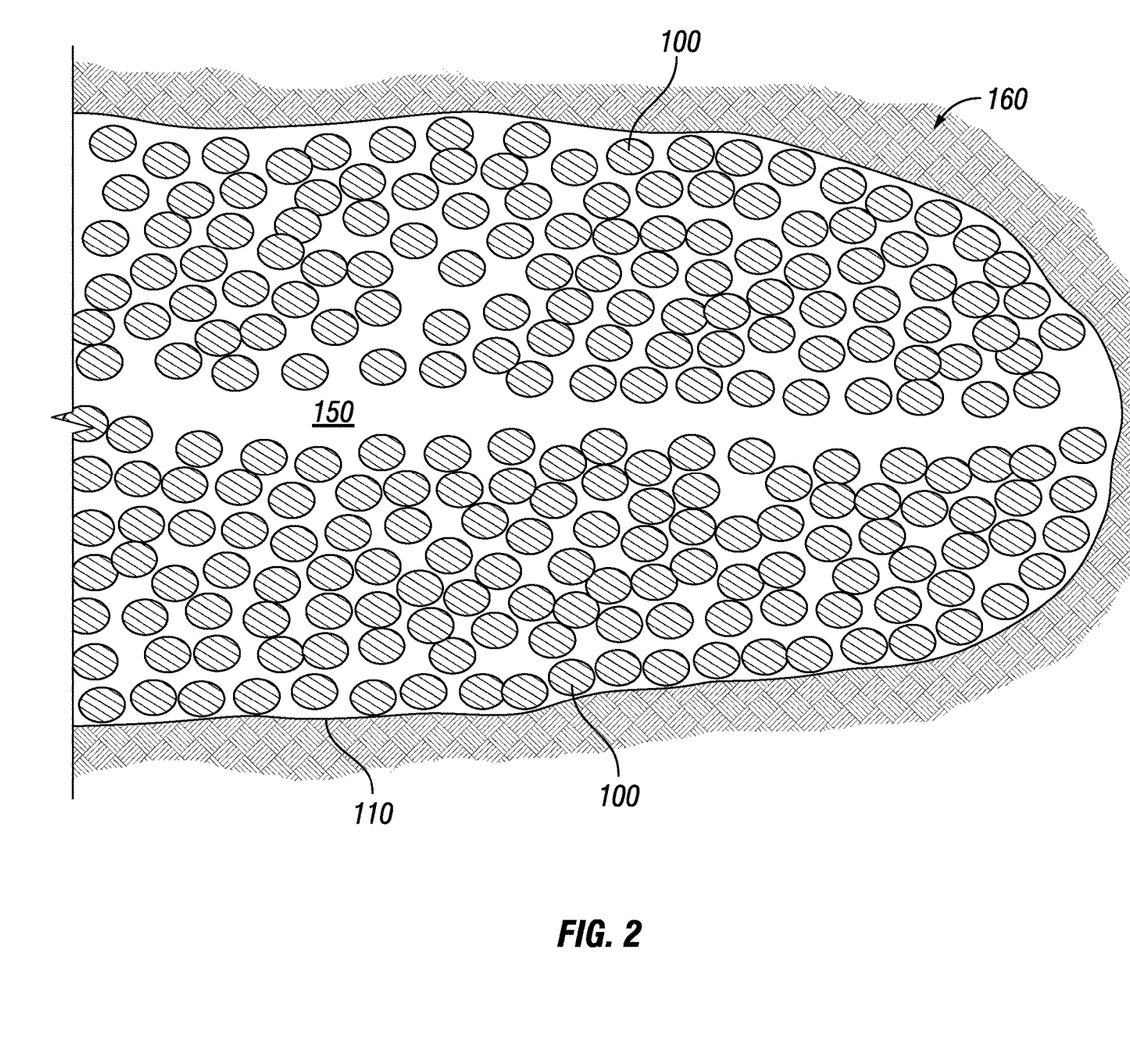
FIG. 2 is a schematic illustration of an example proppant-free channel formed in a fracture.

Referring to FIG. 2, a channel 150 may be formed within fracture 110. As shown, the channel 150 may be proppant-free and should allow relatively unimpeded flow of fluids. The channel 150 more spacious than the interstitial spaces that are typically formed within proppant packs. As previously described, the channel 150 may be formed by back flowing spacer fluid from the fracture 110. The proppant aggregates 100 may have consolidated to form permeable mass 160. Permeable mass 160 may be a substantially rigid mesh that is permeable to gas and formation fluids, for example, due to flow paths between the proppant aggregates 100.

Figure 3:
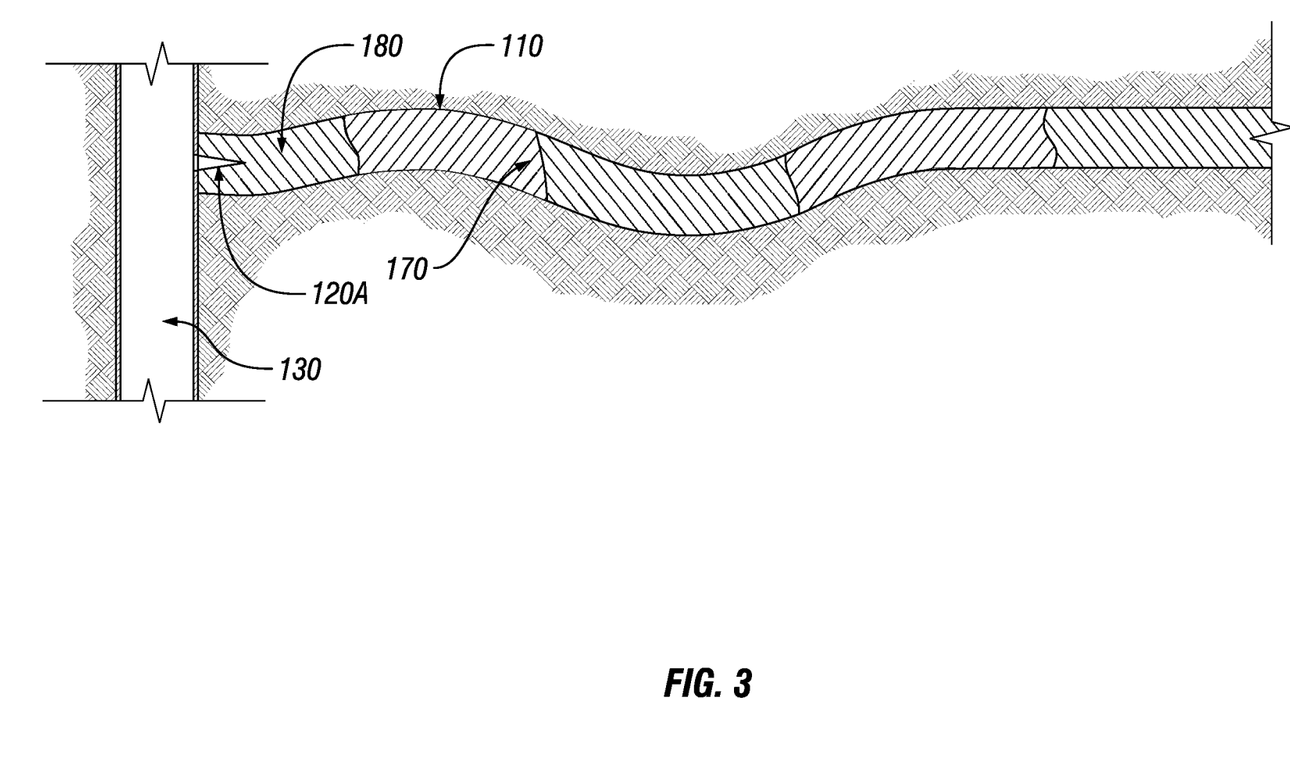
FIG. 3 is a schematic illustration showing intermittent introduction of a fracturing fluid into a fracture.

Referring to FIG. 3, during a treatment operation, spacer fluid 170 and fracturing fluid 180 may be alternatively pumped in relatively small volumes into fracture 110 through perforation 120a. During a treatment operation, the total volume of fluid pumped per minute may be about 10 barrels per minute (bpm) to about 100 bpm. In some examples, the small volumes of fracturing fluid alternately pumped may be about 2 barrels to about 25 barrels. As previously described, spacer fluid 170 may be proppant-free and fracturing fluid 180 may comprise a geopolymer composition and proppant. It should be noted that although only perforation 120a is illustrated, the spacer fluid 170 and fracturing fluid 180 may flow through any perforations present.

Figure 4:
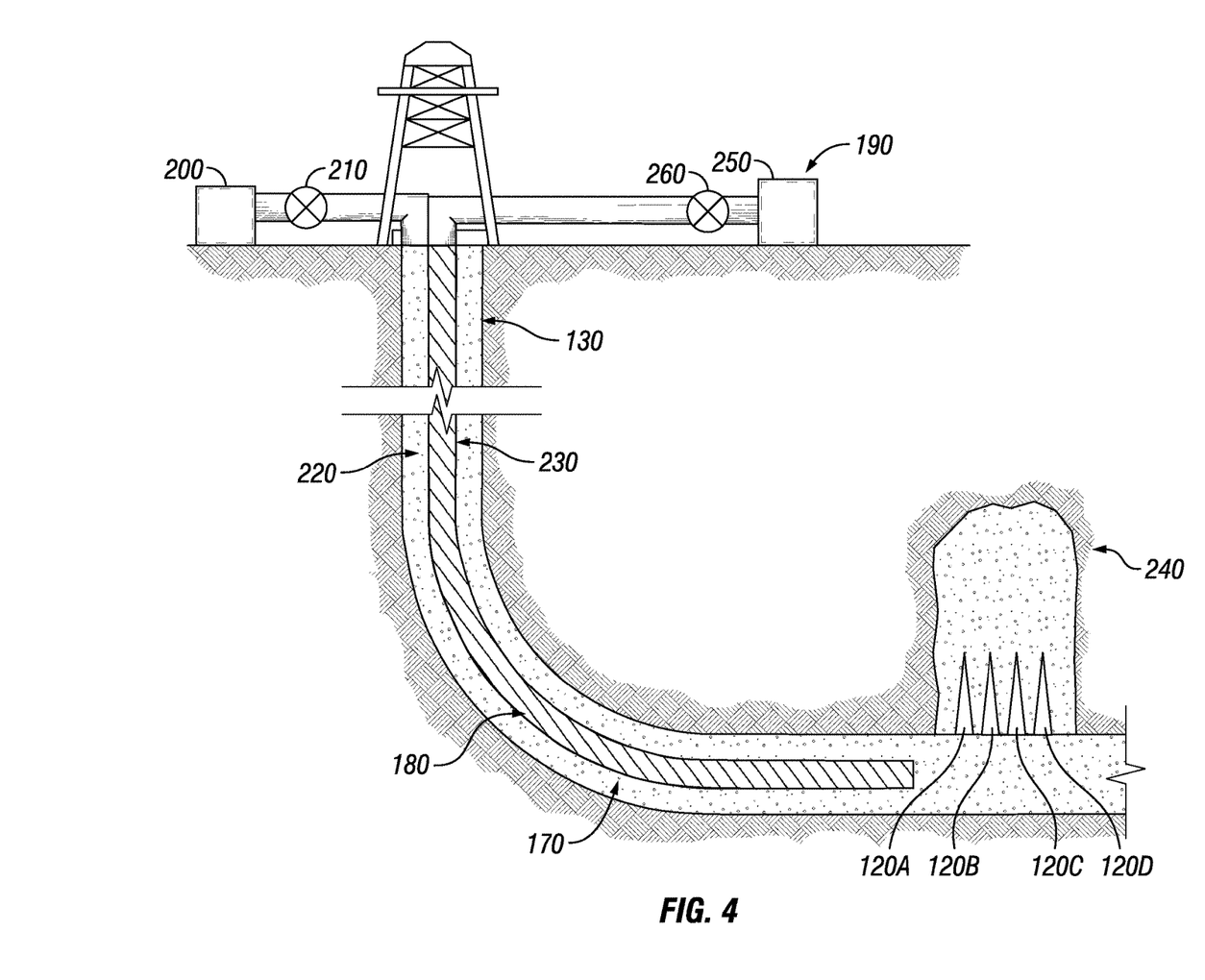
FIG. 4 is a schematic illustration of an example system for delivering fracturing fluids.

Referring to FIG. 4, an example of a well system 190 for introduction of the spacer fluid 170 and fracturing fluid 180 that is proppant laden is shown. As shown, the well system 190 may comprise first mixing equipment 200 and first pumping equipment 210. The first mixing equipment 200 may be used to mix the spacer fluid 170. The first pumping equipment 210 may be fluidically coupled to first mixing equipment 200 and to annulus 220 created between casing or liner 130 and tubulars 230. First pumping equipment 210 may be deliver spacer fluid 170 to annulus 220, where it may be conveyed into subterranean formation 240 through perforations 120a-d. Well system 190 may further comprise second mixing equipment 250 and second pumping equipment 260. Second mixing equipment 250 may mix the fracturing fluid 180, which may comprise the proppant and geopolymer composition. The second pumping equipment 260 may be fluidically coupled to second mixing equipment 250 and tubular 230. Second pumping equipment 260 may deliver fracturing fluid 180 to tubulars 230, where it may be conveyed into subterranean formation 240 through perforations 120a-d. Alternatively, fracturing fluid 180 may be conveyed through annulus 220, spacer fluid 170 may convey through tubulars 230. In another alternative, fracturing fluid 180 and spacer fluid 170 may both be conveyed through annulus 220 or both through tubulars 230. The spacer fluid 170 and fracturing fluid 180 may both be introduced above the fracture gradient of subterranean formation 240. While not shown on FIG. 4, one or more fractures (e.g., fracture 110 on FIG. 1) may have previously been created in subterranean formation 240 such that the spacer fluid 170 and fracturing fluid 180 may be introduced into the fractures. In some examples, the well system 190 may only comprise one mixing equipment and pump. In some examples, the fracturing fluid may be essentially proppant free as previously described, and proppant may be added intermittently to the mixing equipment.

The first pumping equipment 210 and second pumping equipment 260 may include a high pressure pump. As used herein, the term "high pressure pump" refers to a pump that is capable of delivering the fracturing fluid 180 downhole at a pressure of about 1000 psi or greater. A high pressure pump may be used when it is desired to introduce the fracturing fluid 180 into subterranean formation 240 at or above a fracture gradient of the subterranean formation 120, but it may also be used in cases where fracturing is not desired. Suitable high pressure pumps may include, but are not limited to, floating piston pumps and positive displacement pumps.

Alternatively, the first pumping equipment 210 and second pumping equipment 260 may include a low pressure pump. As used herein, the term "low pressure pump" refers to a pump that operates at a pressure of about 1000 psi (6894.76 kPa) or less. A low pressure pump may be fluidly coupled to a high pressure pump that may be fluidly coupled to tubular 230 or annulus 220, for example. The low pressure pump may be configured to convey the spacer fluid 170 or fracturing fluid 180 to the high pressure pump. The low pressure pump may "step up" fluid pressure before it reaches the high pressure pump.

First mixing equipment 200 and second mixing equipment 250 may include a mixing tank that is upstream of the first pumping equipment 210 and/or second pumping equipment 260 and in which the spacer fluid 170 and/or fracturing fluid 180 may be formulated. Alternatively, the spacer fluid 170 and/or fracturing fluid 180 may be formulated offsite and transported to a worksite, in which case the spacer fluid 170 and/or fracturing fluid 180 may be introduced to the tubular 230 and/or annulus 220 directly from its shipping container (e.g., a truck, a railcar, a barge, or the like) or from a transport pipeline.

Figure 5:
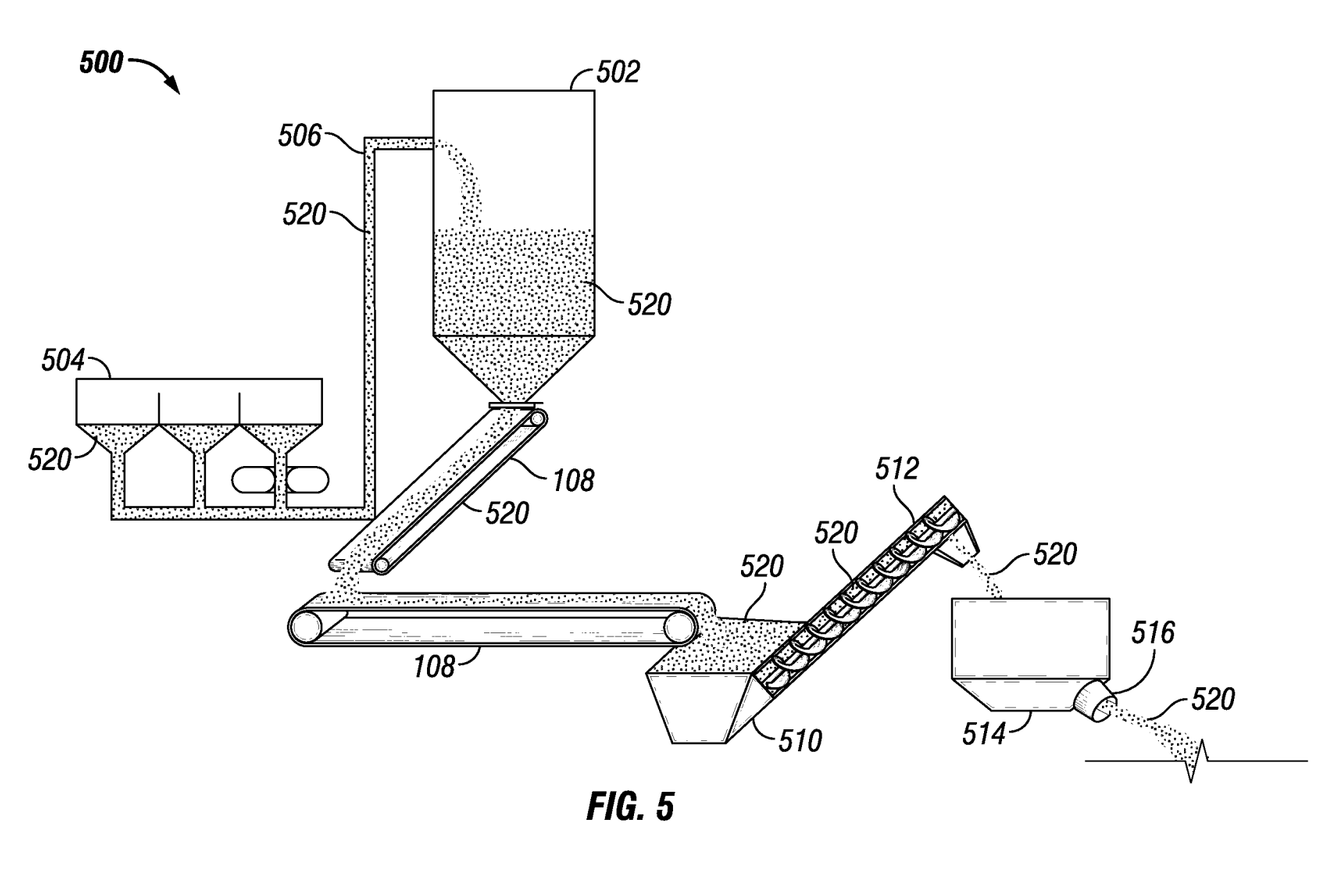
FIG. 5 is a schematic illustration an example system for transferring proppant.

Turning to FIG. 5, a system 500 for transferring proppant from a storage container to one or more mixing vessels is illustrated. The system 500 may include a storage container 502. Storage container 502 may be, for example, a silo or similar container that may be capable of storing a large amount of proppant. The storage compartment may further comprise a transport trailer 504. Transport trailer 504 may transport the proppant to storage container 502, for example, from a warehouse or manufacturing plant. The proppant may be transferred from transport trailer 504 to storage container 502 via a transfer device such as a transfer tube 506. Open conveyors 508 may transfer the proppant from storage container 502 to mixing bin 510. Closed conveyors 512 may transfer the proppant from mixing bin 510 to mixing tub 116. A geopolymer composition, as previously described, may be added at any point during proppant transport. For example, points 520 in transport trailer 504, transfer tube 506, storage container 502, open conveyor 508, closed conveyors 512, mixing bin 510, mixing tub 514, or discharge 516 may all be points where the geopolymer composition may be added.

Accordingly, this disclosure describes systems, compositions, and methods that may use accelerators comprising geopolymers in fracturing operations. The systems, compositions, and methods may include any of the following statements:

Statement 1. A method of treating a subterranean formation comprising: providing a proppant; coating the proppant with a geopolymer composition to create a coated proppant; injecting a fracturing fluid into the subterranean formation, wherein the fracturing fluid comprises a base fluid and the coated proppant; and allowing the geopolymer composition to set in the subterranean formation.

Statement 2. The method of statement 1 wherein the geopolymer composition comprises an aluminosilicate source, a metal silicate source, and an activator.

Statement 3. The method of statement 1 or 2 further comprising pumping a substantially proppant-free pad at a pressure above a fracture gradient into a subterranean formation and creating at least one fracture in the subterranean formation, wherein the injecting the fracturing fluid comprises injecting the fracturing fluid into the at least one fracture.

Statement 4. The method of statement 3 wherein the proppant-free pad comprises additional geopolymer composition such that the additional geopolymer composition is at least partially disposed on faces of at least one fracture in the subterranean formation.

Statement 5. The method of statement 1 or 2 wherein coating the proppant comprises dry blending the proppant with one or more dry components of the geopolymer composition.

Statement 6. The method of statement 1 or 2 wherein coating the proppant comprises wet coating the geopolymer composition on the proppant.

Statement 7. The method of any of the preceding statements wherein the step of injecting further comprises alternately injecting a spacer fluid and the fracturing fluid into at least one fracture in the subterranean formation such that a plurality of proppant aggregates are disposed in the fracture surrounded by the spacer fluid, wherein the proppant aggregates each comprise a portion of the proppant coated with a volume of the geopolymer composition; and allowing the geopolymer composition to set in the subterranean formation such that the proppant aggregates gain consolidation strength.

Statement 8. The method of statement 7 wherein the spacer fluid comprises water, a gelling agent, a crosslinking agent, and a breaker.

Statement 9. The method of statement 7 further comprising allowing the spacer fluid to break after the step of allowing the geopolymer composition to set in the formation and flowing back the spacer fluid from the fracture to remove at least a portion of the spacer fluid from the at least one fracture such that proppant-free channels are formed in the at least one fracture.

Statement 10. The method of statement 1 or 2 wherein the allowing the geopolymer composition to set comprises a reaction that comprises aluminosilicates to form a geopolymer.

Statement 11. The method of statement 1 wherein the proppant comprises at least one particulate selected from the group consisting of silica sand, desert sand, beach sand, brown sand, white sand, ceramic beads, glass beads, bauxite grains, sized calcium carbonate, walnut shell fragments, aluminum pellets, nylon pellets, nut shells, gravel, resinous particles, alumina, minerals, carbon fibers, fiberglass, polymeric particles, volcanic aggregates, expanded perlite pumice, nanoclays, calcium carbonate sand, resin coated sand, ceramic proppants, fly ash, sintered bauxite, and combinations thereof.

Statement 12. A method comprising: injecting into a subterranean formation a substantially proppant-free pad comprising a geopolymer composition at a pressure above a fracture gradient of the subterranean formation; generating at least one fracture within the subterranean formation wherein the fracture comprises fracture faces and wherein the fracture faces are partially coated with the geopolymer composition; providing a proppant; coating a proppant with an additional volume of the geopolymer composition to form a coated proppant; mixing the coated proppant with a base fluid to form a fracturing fluid; injecting the fracturing fluid into the subterranean formation; wherein the injecting the fracturing fluid comprises injecting the fracturing fluid into the at least one fracture; and allowing the geopolymer composition to set in the subterranean formation to form a geopolymer on the fracture faces and on the proppant.

Statement 13. The method of statement 12 wherein the geopolymer composition comprises an aluminosilicate source, a metal silicate source, and an alkali activator.

Statement 14. The method of statement 12 or 13 wherein the base fluid comprises water and a gelling agent.

Statement 15. The method of statement 12 or 13 wherein the step of coating comprises dry coating the geopolymer on the proppant.

Statement 16. The method of statement 12 or 13 wherein the step of coating comprises wet coating the geopolymer on the proppant.

Statement 17. A system for fracturing in a subterranean formation comprising: a base fluid; a vessel configured to accept a proppant and a geopolymer composition wherein the vessel is capable of mixing the proppant and geopolymer composition to at least partially coat the geopolymer composition on the proppant to create a coated proppant; mixing equipment capable of mixing a fracturing fluid wherein the fracturing fluid comprises the coated proppant; and pumping equipment capable of pumping the fracturing fluid.

Statement 18. The system of statement 17 wherein the geopolymer composition comprises an aluminosilicate source, a metal silicate source, and an alkali activator.

Statement 19. The system of statement 17 wherein the base fluid comprises water and a gelling agent.

Statement 20. The system of statement 17, 18, or 19 wherein the proppant comprises at least one particulate selected from the group consisting of silica sand, desert sand, beach sand, brown sand, white sand, ceramic beads, glass beads, bauxite grains, sized calcium carbonate, walnut shell fragments, aluminum pellets, nylon pellets, nut shells, gravel, resinous particles, alumina, minerals, carbon fibers, fiberglass, polymeric particles, volcanic aggregates, expanded perlite pumice, nanoclays, calcium carbonate sand, resin coated sand, ceramic proppants, fly ash, sintered bauxite, and combinations thereof.

Examples

To facilitate a better understanding of the present disclosure, the following example is given. In no way should such examples be read to limit, or to define, the scope of the disclosure.

A geopolymer composition was prepared by mixing 50% w/w fly ash and 50% w/w of class-H cement. The geopolymer composition geopolymer composition in an amount of 8.6 grams was mixed with 3.2 grams of water. Next, 2 grams of this geopolymer slurry was mixed with 8 grams of 20/40

Adwan sand until a homogenous coating of the geopolymer slurry had been formed on the sand grains. The coated sand was then added to 40 mL of 60 lbs/Mgal (27.22 kg/3785 L) xanthan gum gel solution. A small aliquot of the sand/gel solution was added to two spacer fluids. One fluid contained clay nanoparticles and a cross linked gel and the other fluid contained micro-fiber cellulose. The vials were placed in an oven at 200° F. (93.3° C.) for three days. It was observed that the sand grains formed aggregates within the spacer fluid and the geopolymer binder provided consolidation between sand grains.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of treating a subterranean formation comprising:
   providing a proppant;
   coating the proppant with a geopolymer composition to create a coated proppant, wherein the proppant is coated with the geopolymer composition at any time during the treating the subterranean formation;
   preparing a fracturing fluid comprising a base fluid and the coated proppant;
   injecting the fracturing fluid into the subterranean formation at a pressure above a fracture gradient of the subterranean formation; and
   allowing the geopolymer composition to set in the subterranean formation.

2. The method of claim 1 wherein the geopolymer composition comprises an aluminosilicate source, a metal silicate source, and an activator.

3. The method of claim 1 further comprising pumping a substantially proppant- free pad at a pressure above a fracture gradient into the subterranean formation and creating at least one fracture in the subterranean formation, wherein the injecting the fracturing fluid comprises injecting the fracturing fluid into the at least one fracture.

4. The method of claim 3 wherein the proppant-free pad comprises additional geopolymer composition such that the additional geopolymer composition is at least partially disposed on faces of at least one fracture in the subterranean formation.

5. The method of claim 1 wherein coating the proppant comprises dry blending the proppant with one or more dry components of the geopolymer composition.

6. The method of claim 1 wherein coating the proppant comprises wet coating the geopolymer composition on the proppant.

7. The method of claim 1 wherein the step of injecting further comprises alternately injecting a spacer fluid and the fracturing fluid into at least one fracture in the subterranean formation such that a plurality of proppant aggregates are disposed in the fracture surrounded by the spacer fluid, wherein the proppant aggregates each comprise a portion of the proppant coated with a volume of the geopolymer composition; and
   allowing the geopolymer composition to set in the subterranean formation such that the proppant aggregates gain consolidation strength.

8. The method of claim 7 wherein the spacer fluid comprises water, a gelling agent, a crosslinking agent, and a breaker.

9. The method of claim 7 further comprising allowing the spacer fluid to break after the step of allowing the geopolymer composition to set in the formation and flowing back the spacer fluid from the fracture to remove at least a portion of the spacer fluid from the at least one fracture such that proppant-free channels are formed in the at least one fracture.

10. The method of claim 1 wherein the allowing the geopolymer composition to set comprises a reaction that comprises aluminosilicates to form a geopolymer.

11. The method of claim 1 wherein the proppant comprises at least one particulate selected from the group consisting of silica sand, desert sand, beach sand, brown sand, white sand, ceramic beads, glass beads, bauxite grains, sized calcium carbonate, walnut shell fragments, aluminum pellets, nylon pellets, nut shells, gravel, resinous particles, alumina, minerals, carbon fibers, fiberglass, polymeric particles, volcanic aggregates, expanded perlite pumice, nano-clays, calcium carbonate sand, resin coated sand, ceramic proppants, fly ash, sintered bauxite, and combinations thereof.

12. A method comprising:
- injecting into a subterranean formation a substantially proppant-free pad comprising a geopolymer composition at a pressure above a fracture gradient of the subterranean formation;
- generating at least one fracture within the subterranean formation wherein the fracture comprises fracture faces and wherein the fracture faces are partially coated with the geopolymer composition;
- providing a proppant;
- coating a proppant with an additional volume of the geopolymer composition to form a coated proppant;
- mixing the coated proppant with a base fluid to form a fracturing fluid; injecting the fracturing fluid into the subterranean formation, wherein the injecting the fracturing fluid comprises injecting the fracturing fluid into the at least one fracture; and
- allowing the geopolymer composition to set in the subterranean formation to form a geopolymer on the fracture faces and on the proppant.

13. The method of claim 12 wherein the geopolymer composition comprises an aluminosilicate source, a metal silicate source, and an alkali activator.

14. The method of claim 12 wherein the base fluid comprises water and a gelling agent.

15. The method of claim 12 wherein the step of coating comprises dry coating the geopolymer composition on the proppant.

16. The method of claim 12 wherein the step of coating comprises wet coating the geopolymer composition on the proppant.

* * * * *